United States Patent [19]

Leibold

[11] Patent Number: 5,818,736

[45] Date of Patent: Oct. 6, 1998

[54] SYSTEM AND METHOD FOR SIMULATING SIGNAL FLOW THROUGH A LOGIC BLOCK PATTERN OF A REAL TIME PROCESS CONTROL SYSTEM

[75] Inventor: William Steven Leibold, Carefree, Ariz.

[73] Assignee: Honeywell Inc., Minneapolis, Minn.

[21] Appl. No.: 725,005

[22] Filed: Oct. 1, 1996

[51] Int. Cl.[6] ........................................... G06F 9/455
[52] U.S. Cl. ........................................................ 364/578
[58] Field of Search ............................ 395/500; 364/578, 364/488, 489, 490, 491, 148.04, 468.09; 371/61, 62, 72

[56] References Cited

U.S. PATENT DOCUMENTS

| | | | |
|---|---|---|---|
| 4,852,047 | 7/1989 | Lavallee et al. | 364/191 |
| 5,253,158 | 10/1993 | Suzuki et al. | 364/140 |
| 5,390,320 | 2/1995 | Smithline | 395/500 |
| 5,422,833 | 6/1995 | Kelem et al. | 364/578 |
| 5,483,440 | 1/1996 | Aono et al. | 364/167.01 |
| 5,553,001 | 9/1996 | Seidel et al. | 364/488 |
| 5,555,201 | 9/1996 | Dangelo et al. | 364/489 |
| 5,572,710 | 11/1996 | Asano et al. | 395/500 |

FOREIGN PATENT DOCUMENTS

| | | | |
|---|---|---|---|
| 0 435 215 A1 | 7/1991 | European Pat. Off. | G05B 17/00 |
| 0 553 026 A1 | 7/1993 | European Pat. Off. | G05B 19/05 |
| WO 90/15391 | 12/1990 | WIPO | G06F 15/18 |

OTHER PUBLICATIONS

Publication by OrCad entitled "Simulate for Windows" dated 1996.

Product Specification PSS 21S–7A1 B3 entitled I/A Series FoxCAE Engineering Package for Windows by Foxboro, a SIEBE Company, pp. 1–16: dated 1993–1994.

*Primary Examiner*—Kevin J. Teska
*Assistant Examiner*—Matthew Clay Loppnow
*Attorney, Agent, or Firm*—David H. Hitt; William A. Munck

[57] ABSTRACT

A testing system for, and method of, simulating signal flow through a logic block pattern of a real time process control system. The system includes: (1) a memory that contains a data base of input data associated with simulated sensors and a rule base containing control rules and constituting a logic block pattern and (2) a processor that operates in an arbitrary time base to apply the input data to the control rules to simulate signal flow through the logic block pattern and thereby produce simulated output data and real time control system responses thereby testing the logic block pattern, the memory and the processor being detached from the real time process control system to prevent use of resources thereof in connection with the logic block pattern testing.

20 Claims, 11 Drawing Sheets

```
                                      500
┌─────────────────────────────────────────────────┐
│ ▬              Logic Blocks #7 Edit             │
├─────────────────────────────────────────────────┤
│                                                 │
│  LOGIC BLOCK NUMMBER      [LEINDEX]             │
│  LOGIC BLOCK ALGORITHM    [LOGALID]  │ AND  │   │
│  STATUS INPUT #1             [S1]    │ SO2  │   │
│  STATUS INPUT #2             [S2]    │ L3   │   │
│  STATUS INPUT #3             [S3]    │ FL2  │   │
│  STATUS INPUT #4             [S4]    │      │   │
│  S1 INPUT REVERSED        [S1REV]    │ ON   │   │
│  S2 INPUT REVERSED        [S2REV]    │ ON   │   │
│  S3 INPUT REVERSED        [S2REV]    │ OFF  │   │
│  REAL NUMBER INPUT #1        [R1]    │      │   │
│  REAL NUMBER INPUT #2        [R2]    │      │   │
│                                                 │
│  DEADBAND                [DEADBAND]  │      │   │
│  DELAY TIME               [DLYTIME]  │      │   │
│                                                 │
│       ┌──────┐       ┌────────┐    ┌──────┐     │
│       │  OK  │       │ Cancel │    │ Help │     │
│       └──────┘       └────────┘    └──────┘     │
└─────────────────────────────────────────────────┘
```

*Fig.5*

| Logic Point | Device Control Point |
|---|---|
| Go to > | Go to > |
| Next | Next |
| Previous | Previous |
| First | First |
| Last | Last |
| Display Connections | Display Connections |
| Save Point | Save Point |
| Save Pattern As... | Save Pattern As... |
| View Pattern... | View Pattern... |
| Clear Pattern | Clear Pattern |
| Paste Pattern... | Paste Pattern... |
| Undo Pattern Paste | Undo Pattern Paste |
| Edit Block | Edit Block |
| Move Block | Start Simulation |
| Copy Block | Stop Simulation |
| Paste Block | Vary Inputs |
| Start Simulation | Watch Outputs |
| Stop Simulation | DC Simulator |
| Vary Inputs | Set Scan Rate |
| Watch Outputs | Print... |
| Set Scan Rate | Help |
| Print... | |
| Help | |

| | Logic Connections | | |
|---|---|---|---|
| INPUT CONNECTIONS | | OUTPUT CONNECTIONS | |
| LISRC | | LOSRC LODSTIN | LOENBL |
| L1 | -.- | 1 | S01 TAG_C.S2 | FL2 |
| L2 | TAG_A.MANMODFL | 2 | S01--TAG_D.S1------ | FL2--- |
| L3 | TAG_B.MANMODFL | 3 | FL7 TAG_C.S1 | FL2 |
| L4 | -.- | 4 | FL7--TAG_D.S2------ | FL2--- |
| L5 | -.- | 5 | S04 TAG_E.ESWMAN | FL2 |
| L6 | -.- | 6 | S06--TAG_E.ESWCAS--- | FL2--- |
| L7 | -.- | 7 | S08 TAG_E.ESWMAN | FL2 |
| L8 | -.- | 8 | S010--TAG_E.FSWCAS--- | FL2--- |
| L9 | -.- | 9 | | |
| L10 | -.- | 10 | | |
| L11 | -.- | 11 | | |
| L12 | -.- | | | |

*Fig. 7*

Logic Block Pattern Links Descriptors

| | Logic Input Source Descripters | LOSRC | Logic Output Destination Descriptors | LOEHBL |
|---|---|---|---|---|
| L1 | -.- | S01 | 43FSWT0011.S2 | FL2 |
| L2 | 43FC1011.MANMODFL | S01 | 43FSWT0012.S1 | FL2 |
| L3 | 43FC1012.MANMODFL | FL7 | 43FSWT0011.S1 | FL2 |
| L4 | -.- | FL7 | 43FSWT0012.S2 | FL2 |
| L5 | -.- | S04 | 43FCH011.ESWMAN | FL2 |
| L6 | -.- | S06 | 43FCH011.ESWCAS | FL2 |
| L7 | -.- | S08 | 43FCH012.ESWMAN | FL2 |
| L8 | -.- | S010 | 43FCH012.ESWCAS | FL2 |
| L9 | -.- | | | |
| L10 | -.- | | | |
| L11 | -.- | | | |
| L12 | -.- | | | |

PATTERN [Type new Logic block pattern description here...]

[Save] [Cancel] [Help]

| Simulator Inputs | | | |
|---|---|---|---|
| Numaric | | Logical | |
| L1 | | On • | Off |
| L2 | | On • | Off |
| L3 | | On • | Off |
| L4 | | On • | Off |
| L5 | | On • | Off |
| L6 | | On • | Off |
| L7 | | On • | Off |
| L8 | | On • | Off |
| L9 | | On • | Off |
| L10 | | On • | Off |
| L11 | | On • | Off |
| L12 | | On • | Off |

1000

| Numaric | | Logical | | |
|---|---|---|---|---|
| NN1 | 5B | FL3 | On • | Off |
| NN1 | | FL4 | On • | Off |
| NN1 | | FL5 | On • | Off |
| NN1 | | FL6 | On • | Off |
| NN1 | | FL7 | On • | Off |
| NN1 | | FL8 | On • | Off |
| NN1 | | FL9 | On • | Off |
| NN1 | | FL10 | On • | Off |
| | | FL11 | On • | Off |
| | | FL12 | On • | Off |

*Fig. 10*

SYSTEM AND METHOD FOR SIMULATING SIGNAL FLOW THROUGH A LOGIC BLOCK PATTERN OF A REAL TIME PROCESS CONTROL SYSTEM

CROSS-REFERENCE TO RELATED APPLICATIONS

The present invention is related to those disclosed in U.S. Pat. No. 4,607,256 issued to Henzel on Aug. 19, 1986, entitled "Plant Management System;" U.S. Pat. No. 5,333,298 issued to Bland, et al., on Jul. 26, 1994, entitled "System for Making Data Available to an Outside Software Package by Utilizing a Data File which Contains Source and Destination Information;" and U.S. Pat. No. 5,386,503 issued to Staggs, et al., on Jan. 31, 1995, entitled "Method for Controlling Window Displays in an Open Systems Environment." Each of the above-referenced patent documents is commonly assigned with the present invention and is incorporated herein by reference for all purposes.

TECHNICAL FIELD OF THE INVENTION

The present invention is directed, in general, to computing systems and, more specifically, to a system and method, for simulating signal flow through a logic block pattern of a real time process control system without employing any of the resources of the process control system itself.

BACKGROUND OF THE INVENTION

Automated plant control systems, such as the TDC 3000 Industrial Automation Systems, manufactured by and commercially available from HONEYWELL INC. of Phoenix, Ariz., include a comprehensive set of algorithms and auxiliaries to control and monitor various processes within, for instance, a manufacturing or process facility. The control systems may be tailored to satisfy a wide range of process requirements globally or within specified portions of the facility. Conventionally, the control systems include a plurality of modules, each having its own hardware, software and firmware, linked together by a communication bus thereby resulting in a distributed process control system. The distributed nature of the system affords high performance with the capability to expand the system incrementally to satisfy growth or modifications in the facility.

A first objective of automated plant management is to provide a control scheme that synthesizes plant-wide control of all processes to thereby improve an overall efficiency of the facility. A second objective is to couple the control scheme to the facility by providing a real time data acquisition and monitoring scheme that monitors the operation of the facility by collecting historical and real time data and responding to deviations from desired operation that may arise.

Regarding the first objective, U.S. Pat. No. 4,607,256 provides a plant-wide system for monitoring and controlling an industrial and electrical utility plant, including communication within the system and the related management of the processes within the plant. More specifically, the plant management system incorporates a "token-passing" arrangement employing separate modules of various types. A module transmits information to or receives information from another module located on one or more common buses. Each of the modules functions as a peer within the network and is assigned an individual network address. A token passed among the modules gives the module that possesses the token the right to access the bus and transmit a signal to the address of another module located on the bus. Automated control systems, such as the one disclosed in U.S. Pat. No. 4,607,256, are well known in the art.

Regarding the second objective, it is critical to have timely, accurate information regarding the operational parameters of the facility to control the operation of the facility successfully. Thus, timing is everything with respect to requests made for data or for actions to be taken and the fulfilling of those requests. In a complex plant containing tens of thousands of sensors and controllable devices, interactions may occur during operation of the plant control system that disturb the sensitive timing of data flow.

Since each process plant is different, customized automated plant management systems, as is easily imagined, are very expensive. In an effort to reduce this cost, companies, such as HONEYWELL, have designed and developed tailorable management system solutions—single systems' that are configurable for different process plants. HONEYWELL'S TDC 3000 solution, for example, includes a configurable logic point. A typical logic point includes many configurable subunits, or logic blocks, that are used to provide the logic required to implement a control strategy for a particular process plant, or facility.

Early on, the plant management system was installed in the plant, the logic point was partially configured and the system was turned on and tested in real time. This involved many, if not all, of the plant's personnel. Typically, as adjustments were made to one part of the system, another part of the system was affected. While many of these interactions could be worked out during installation and testing, the occurrence of an infrequent interaction could shut the plant down at later time during full operation.

Later on, actual system resources—typically, processing power—were used to identify and resolve interactions. Still, it was found that the correction or, even, "tuning" of some portion of the logic point, while resolving the same, would exacerbate or create another interaction. Use of system resources to identify and resolve interactions ties up system resources that may itself cause spurious interaction—the mere act of observing the control strategy in operation changes the outcome of the operating control strategy.

Therefore, what is needed in the art is a way of identifying and resolving interactions that does not employ any of the resources of the process control system itself.

SUMMARY OF THE INVENTION

To address the above-discussed deficiencies of the prior art, it is a primary object of the present invention to provide a system and methodology for identifying and resolving interactions that do not employ any of the resources of a process control system itself.

In the attainment of the above primary object, the present invention provides a testing system for, and method of, simulating signal flow through a logic block pattern of a real time process control system. The system includes: (1) a memory that contains a data base of input data associated with simulated sensors and a rule base containing control rules and constituting a logic block pattern and (2) a processor that operates in an arbitrary time base to apply the input data to the control rules to simulate signal flow through the logic block pattern and thereby produce simulated output data and real time control system responses thereby testing the logic block pattern, the memory and the processor being detached from the real time process control system to prevent use of resources thereof in connection with the logic block pattern testing.

The present invention therefore introduces the concept of providing a completely independent testing system that contains a real logic block pattern to be tested, but otherwise simulates the input data, output data and system responses. By providing a testing system that is fully detached from the real time process control system, the present invention frees the real time process control system from testing responsibilities. This decreases testing expense by enabling the logic block pattern to be tested without involving operation of the real time process control system or the plant associated therewith. Further, plant personnel time is spared in not having to deal with the plant control system. Finally, fully independent operation allows the time base of the testing system to be decoupled from real time ("arbitrary"). In a real time process control system, data are constrained to arrive and depart the system in real time. In the testing system of the present invention, the time base is allowed to expand or contract, as necessary to examine single interactions closely or to move through a volume of data quickly.

In one embodiment of the present invention, the logic block pattern is replicated in the real time process control system following the testing of the logic block pattern. In this embodiment, the testing system is employed to test the logic block pattern before the pattern is installed in the real time process control system, perhaps even before the plant to be controlled exists. Advantageously, this would allow plants to be designed in advance to avoid interactions that would be detrimental to their operation.

In one embodiment of the present invention, the real time process control system comprises at least a selected one of firmware storage circuitry and application specific integrated circuitry to contain the logic block pattern. As those skilled in the art understand, conventional logic devices, such as programmable logic arrays ("PALs") and application-specific integrated circuits ("ASICs") are advantageously employed to accomplish simultaneous control of multiple devices by removing dependencies that occur when data is required to be processed serially, such as in a conventional scalar computer processor. The real time process control system preferably also uses PALs, ASICs and other firmware or hardware devices to store the logic block pattern. Because the testing computer of the present invention is not constrained to operate in real time, the logic block pattern can be stored in computer memory and executed serially; the time base simply shifts to make the serial execution quasi-simultaneous.

In one embodiment of the present invention, the testing system further comprises a data input device that allows the control rules to be modified as a function of a deviation of the simulated output data and real time control system responses from expected values thereof. Optimally, as testing of the logic block pattern reveals undesirable interactions and those interactions are resolved, the present invention allows the logic block pattern to be modified to remove the interactions. What results is an iterative process of "debugging" the logic block pattern until all undesirable interactions are eliminated. Only then is the logic block pattern ready to be given over to the real time process control system.

In one embodiment of the present invention, the simulated output data are associated with simulated controllable devices of the real time process control system. In a manner to be described more fully, a real time process control system retrieves input data from sensors (for temperatures, pressures, flow rates and the like) in the controlled plant and commands from users (such as requests for information and commands) and produces output data to give information regarding the operation of the plant (such as production quantities and equipment breakdown) to the users and real time control system responses to control the controllable devices (such as valves, motors and heaters) in the plant.

In one embodiment of the present invention, the testing system further comprises a visual display that displays the logic block pattern as a collection of associated graphical block elements. The embodiment to be illustrated and described advantageously employs a windowed, graphical user interface ("GUI") environment to display the logic block pattern in a form that is intuitively easy to understand. Those skilled in the art are familiar with GUIs and their use in control environments.

In one embodiment of the present invention, active ones of the associated graphical block elements are designated in a contrasting color from inactive ones of the associated graphical block elements during the testing of the logic block pattern. By coloring the block elements differently, this embodiment of the present invention yields a display that assists identification and resolution of interactions. Other contrast indicia, such as shape or text attributes, are within the broad scope of the present invention.

In one embodiment of the present invention, the arbitrary time base is nonlinear. The time base may be enlarged or reduced, as necessary, to test the logic block pattern expeditiously.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a graphical user interface screen of an exemplary logic block edit form in accordance with the illustrated embodiment;

FIG. 6 illustrates a graphical user interface screen of an exemplary logic point/device control point menu in accordance with the illustrated embodiment;

FIG. 7 illustrates a graphical user interface screen of an exemplary logic point connection menu in accordance with the illustrated embodiment;

FIG. 8 illustrates a graphical user interface screen of an exemplary logic block pattern link descriptor menu in accordance with the illustrated embodiment;

FIG. 10 illustrates a graphical user interface screen of an exemplary simulator input menu, accordance with the illustrated embodiment;

DETAILED DESCRIPTION

As stated hereinabove, the present invention is directed to a testing system for, and method of, simulating signal flow through a logic block pattern of a real time process control system, the real time process control system including an actual logic block that is used to implement a control configuration or strategy for the real time process control system.

An exemplary embodiment of the present invention includes at least a memory and a processor. The memory contains a data base of input data associated with simulated sensors and a rule base containing control rules and constituting a logic block pattern. It should be noted that the rule base is preferably also stored in memory also advantageously use a suitable data base configuration also.

The processor may suitably operate in an arbitrary time base to apply the input data to the control rules to simulate signal flow through the logic block pattern to produce simulated output data and real time control system responses to test the logic block pattern. The memory and processor are detached from the real time process control system to prevent use of resources thereof in connection with the logic block pattern testing. It should further be noted that a logic block pattern may represent a single logic block or a plurality of logic block configurable into at least a portion of a logic point (e.g., a larger control strategy).

Each of the terms "include," "includes" or "including," as used herein, means inclusion without limitation; the phrase "associated with" and any derivatives thereof, as used herein, may mean to include within, interconnect with, contain, be contained within, connect to or with, couple to or with, be communicable with, juxtapose, cooperate with, interleave, be a property of, be bound to or with, or the like; and the term "or," as used herein, is inclusive, meaning and/or.

Before undertaking a more detailed description of the above-described embodiment, it will be helpful to describe a real time process control system whose logic block or logic point may be simulated in accordance with the principles of the present invention.

Figure 1:
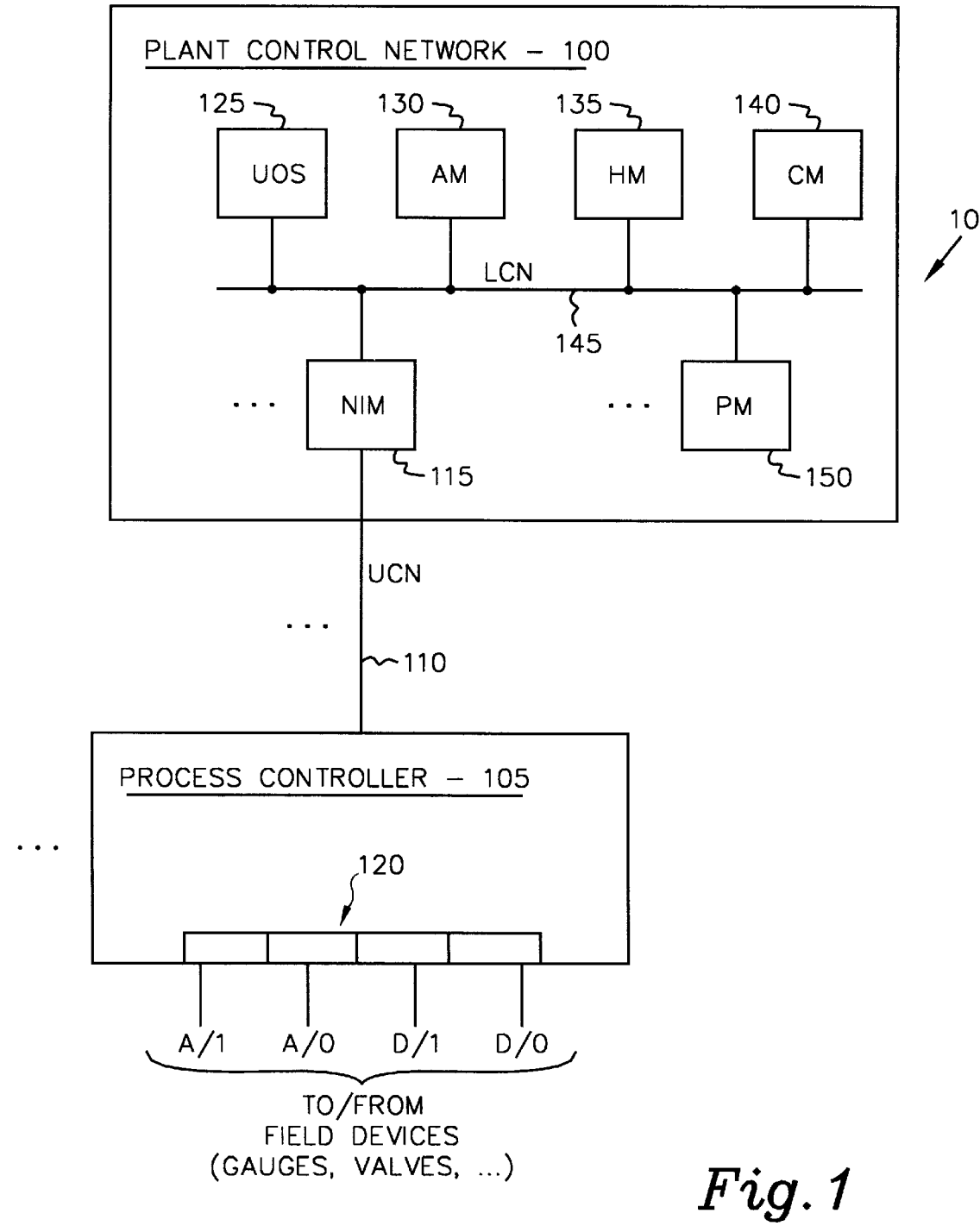
FIG. 1 illustrates a high-level block diagram of a real time process control system with which the present invention may suitably be associated.

Referring initially to FIG. 1, illustrated is a high-level block diagram of a real time process control system (generally designated 10), such as HONEYWELL'S TDC 3000 Industrial Automation System, for example, with which the present invention may suitably be associated. HONEYWELL'S TDC 3000 Industrial Automation System is manufactured by, and commercially available from, HONEYWELL, INC., of Phoenix, Ariz. Exemplary process control system 10 illustratively includes a conventional plant control network 100 that is associated with a process controller 105 via a universal control network ("UCN") 110.

Exemplary plant control network 100 illustratively includes a network interface module ("NIM") 115, a universal operator station module ("UOS") 125, an application module ("AM") 130, a history module ("HM") 135, a computing module ("CM") 140, a Process Manager module ("PM") 150 and, possibly, duplicates of these modules (as well as additional module types, not shown, such as application dependent modules) as necessary to perform required control and supervisory functions of a process plant or facility controlled by real time process control system 10. The above-identified modules are associated via a local control network ("LCN") 145.

Exemplary process controller 105 is associated with a plurality of communication interfaces 120 that is operative to transmit or receive data signals, such as analog, digital or other like signals, for example. According to the illustrated embodiment, the data signals may suitably be communicated electrically, although in alternate embodiments, the data signals may also be communicated optically, magnetically or combinations of the like.

Exemplary communication interfaces 120 are illustratively operative to transmit or receive analog input signals ("A/I"), analog output signals ("A/O"), digital input signals ("D/I") and digital output signals ("D/O"). These exemplary signals may suitably be communicated between plant control network 100 via process controller 105 and UCN 110 and a variety of conventional field devices (not shown), such as valves, pressure switches, pressure gauges, thermocouples or the like sensing/control devices.

According to the illustrated embodiment, process controller 105, in whole or in part, may be programmable to function as a logic point. The logic point comprising a plurality of associated logic blocks. Each logic block may suitably be software-, firmware- or hardware-based, although, according to the illustrated embodiment, each of the logic blocks of HONEYWELL'S TDC 3000 comprises a plurality conventional discrete-type (e.g., "AND," "OR," "NAND," "NOR," "NOT," and "EOR") and analog-type devices (e.g., "Lte," "Gte," and "GT"). The plurality of logic blocks making up a single suitably arranged logic point that is used to implement a control strategy wherein ones of the plurality of configurable logic blocks enable implementation of a logic block pattern to effectuate desired control behavior in accordance with the principles of the present invention.

HONEYWELL'S TDC 3000 Industrial Automation System logic point is suitably configurable to include up to 24 logic blocks that represent the logic components, or gates, thereof. Those of ordinary skill in the art will recognize that this ceiling is design-based and, further, that a typical logic block may include any suitably arranged programmable processing circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or other like embodiments, to form the various types of circuitry comprising logic blocks, and, more generally, the logic point, described herein.

While the illustrated embodiment includes but a single plant control network 100 and process controller 105, it should also be noted that alternate embodiments of process control system 10 may suitably include a multitude of process controllers 105 associated with plant control network 100 via one or more UCNs 110, as well as vice versa.

Exemplary NIM 115 is operative to communicate data signals between UCN 110 and LCN 145 thereby proving an interface between the same.

Exemplary UOS 125 is a workstation for one or more plant operators, and may include an operator interface, such as a graphical user interface ("GUI"), for communication between one or more plant operators and the process or processes of the plant. All communication between UOS 125 and any other module of plant control network 100 is by means of LCN 145. UOS 125 has access to data that is on LCN 145 and the resources and data available through, or from, any of the other modules of plant control network 100 or process controller 105 via UCN 110.

Exemplary AM 130 is operative to provide additional data-processing capability in support of process control functions performed by process controller 105, such as data acquisition, alarm, batch history collection and providing continuous control computational facilities as needed. The data processing capability of AM 130 is provided by a conventional suitably arranged processor and associated memory (not shown).

Exemplary HM 135 is operative to provide large scale data storage. HM 135 may include at least one conventional suitably arranged disk mass-storage device, for example. The disk mass-storage device may provide large volume storage of data. The types of data stored by such mass storage devices are typically trend histories or data from which such trends may be determined, data that constitutes or forms displays, copies of programs, data bases, or the like.

Exemplary CM 140 is operative to use standard or common units of the exemplary physical modules to enable a medium-to-large scale, general-purpose data-processing system to communicate with other modules of plant control network 100 over LCN 145 and process controller 105 via NIM 115 and UCN 110. Conventional data processing systems of CM 140 provide supervisory, optimization, generalized user program preparation and execution of such programs, typically in high-level programming languages. These data processing systems may be capable of communicating with other like systems via conventional communication systems, or networks, and communication lines, as is well known in the art.

Exemplary CM 140 may include any conventional suitably arranged computer, or plurality of computers. One exemplary computer is the HONEYWELL DPS-6, which has been used in CM 140, and which is available from HONEYWELL, INC. of Minneapolis, Minn., or the HEWLETT-PACKARD ("HP") PA-RISC system, which is available from HEWLETT-PACKARD of 3000 Hanover St., Palo Alto, Calif. 94304, to name two examples.

Exemplary PM 150 is operative to provide flexible and powerful process scanning and control capabilities using a processing architecture having multiple processors, each dedicated to performing a specific task. PM 150 includes an Advanced Process Manager Module ("APMM") and an I/O Subsystem (not shown).

The APMM consists of a communication processor and modem, I/O link interface processor, and control processor. The communication processor may be optimized to provide high performance network communications, handling such functions as network data access and peer-to-peer communications. The control processor may be dedicated to executing regulatory, logic, and sequence functions, including a user programming facility. Because communication and I/O processing are performed by separate dedicated hardware, the full power of the control processor can be applied to control strategy implementation. The I/O link interface processor is the interface to the I/O Subsystem.

The I/O Subsystem consists of a redundant I/O link and the I/O processors. These I/O processors handle field I/O for both data acquisition and control functions. The I/O processors, for example, may provide such functions as engineering unit conversion and alarm limit checking independent of the APMM. Control operations are performed within the APMM, with all data acquisition being performed in I/O processors. The process engineer has complete flexibility of choice, within the maximum APM design limits, in the assignment of point types and control strategies.

Exemplary LCN 145 may suitably employ a conventional high-speed communication bus to interconnect the exemplary modules (e.g., UOS 125, AM 130, etc.). Such a bus will provide a principle data transfer path between the data sources, such as NIM 115, AM 130, HM 135, etc., and the principal users of such data, such as UOS 125, AM 130 and CM 140. The bus also provides a suitable communication medium over which large blocks of data, such as memory images, may suitably be moved from one module, such as HM 135, to another, such as UOS 125.

A more complete description of an advantageous process control system 10 may be found in U.S. Pat. No. 4,607,256, commonly owned along with the present patent document and incorporated herein by reference for all purposes.

Figure 2:
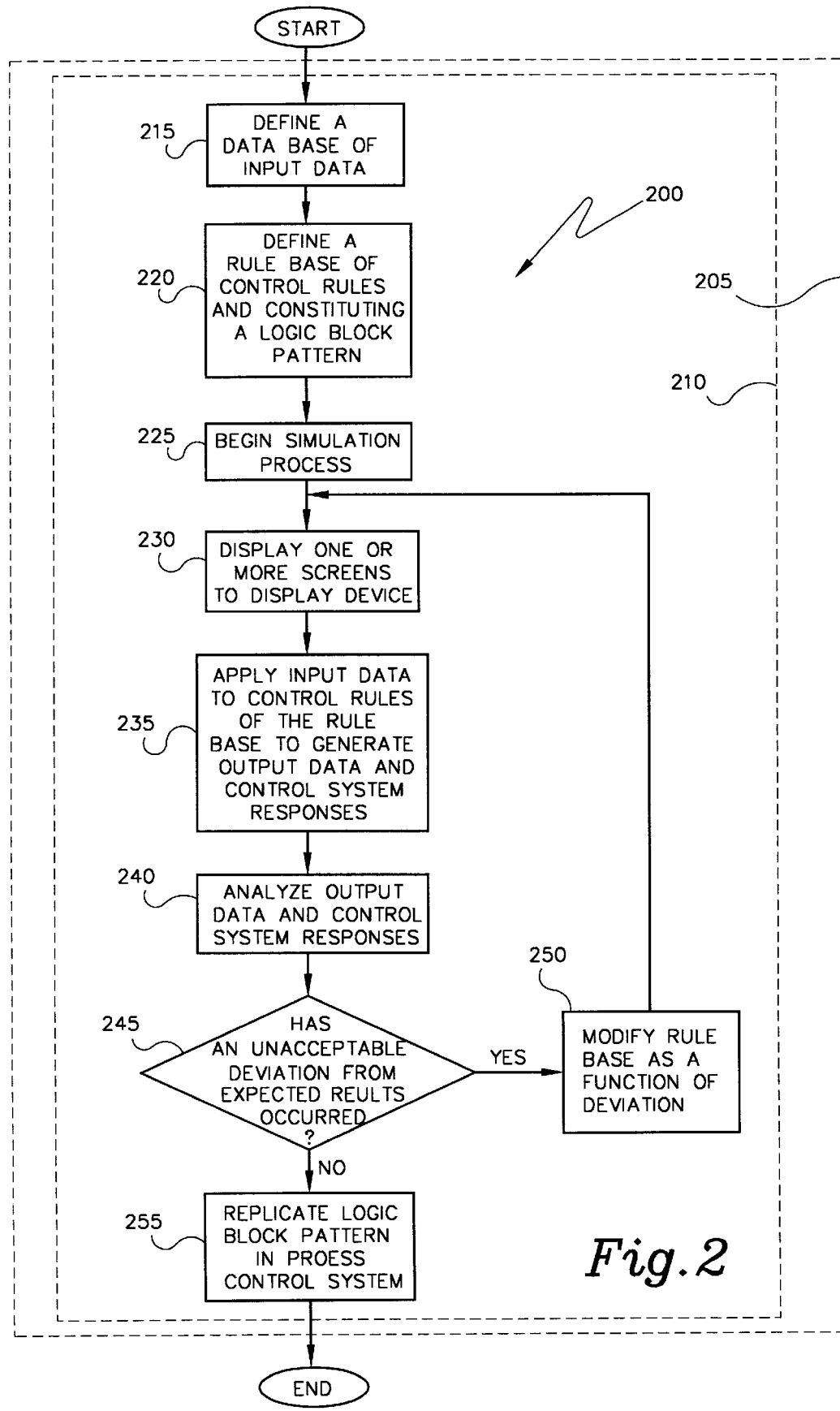
FIG. 2 illustrates a flow diagram of an exemplary method of operating a computer system to simulate signal flow through a logic block pattern of a real time process control system according to the principles of the present invention.

Turning now to FIG. 2, illustrated is a flow diagram of an exemplary method (generally designated 200) of simulating signal flow through a logic block pattern of exemplary real time process control system 10 of FIG. 1. The exemplary logic block pattern may represent a single logic block, a plurality of logic blocks, a logic point. Exemplary method 200 may suitably be implemented and operated within a computer (generally designated 205) and, more particularly, in association with conventional processing circuitry (generally designated 210).

To begin, a user defines a data base of input data associated with simulated sensors for use in a process facility (process step 215), such as those associated with valves, pressure switches and gauges, thermocouples or other like sensing/control devices discussed with reference to FIG. 1, and stores the data base in memory. The user also defines a rule base containing control rules and constituting a logic block pattern also for use in the process facility and stores the rule base in memory (process step 220). Individual, as well as multiple, control rules constituting the logic block pattern may represent conventional discrete-type and analog-type devices comprising an actual logic block, which may be configured within process controller 105 of FIG. 1. Although process steps 215 and 220 are illustrated sequentially, they may in fact be performed concurrently or in reverse order.

The user begins the simulation process (process step 225). Exemplary computer 205 (and by implication, also exemplary processing circuitry 210) displays one or more screens illustrating at least one of the logic block pattern or the progress of the simulation process, the display may be on a conventional display device associated with computer 205 (process step 230). The display is preferably accomplished as a collection of associated graphical block elements.

The collection of associated graphical block elements may suitably be displayed in a windowed environment (e.g., GUI) to display the logic block pattern in a form that is intuitively easy to understand. Those skilled in the art are familiar with windowing technology and their suitability in control environments. In one advantageous embodiment, active ones of the associated graphical block elements may suitably be designated in a contrasting color from inactive ones of the associated graphical block elements during the testing of the logic block pattern. By coloring the block elements differently, this embodiment yields a display that assists identification and resolution of interactions. Other contrast indicia, such as shape or text attributes, for example, are certainly within the scope of the present invention.

Exemplary computer 205, operating in an arbitrary time base, applies the input data to the control rules to simulate signal flow through the logic block pattern and may operate to produce simulated output data and real time control system responses thereby testing the logic block pattern (process step 235). Application of the input data to the control rules, simulation of signal flow through the logic block pattern, and production of the simulated output data and real time control system responses are performed on computer 205 off-line, or detached, from real time process control system 10 to prevent use of resources thereof in connection with this logic block pattern testing.

Computer 205 introduces the concept of providing a completely independent testing system that contains a logic block pattern to be tested, but otherwise simulates the input data, output data and system responses. By providing testing system 200 as fully detached from real time process control system 10, the illustrated embodiment frees process control system 10 from testing responsibilities. This decreases testing expense by enabling the logic block pattern to be tested without involving operation of process control system 10 or the plant associated therewith. Plant personnel's time is spared in not having to deal with the plant's process control system.

Finally, fully independent operation allows the time base of the testing system to be decoupled from real time, hence "arbitrary". In real time process control system 10, data are constrained to arrive and depart the system in real time. In testing system 200 of the illustrated embodiment, the time base is allowed to expand or contract, as necessary to examine single interactions closely or to move through a volume of data quickly. The arbitrary time base may be nonlinear and the time base may be enlarged or reduced, as necessary, to test the logic block pattern expeditiously.

Computer 205 analyzes the simulated output data and real time control system responses (process step 240). If an unacceptable deviation of the simulated output data or real time control system responses from expected values thereof occurs (YES branch of decisional step 245), then testing system 200 may suitably modify the rule base as a function of the deviation (process step 250) and the simulation process of the illustrated embodiment may, at least in part, be restarted. The modification step may be automatic, manual or a suitable combination of the same. The deviation determination may suitably be performed in accordance with conventional applied mathematic, statistic or other like formulas or applications.

Optimally, as testing of the logic block pattern reveals undesirable interactions and those interactions are resolved, the illustrated embodiment allows the logic block pattern to be modified to remove the interactions. What results is an iterative process of "debugging" the logic block pattern until all undesirable interactions are eliminated. Only then is the logic block pattern ready to be given over to real time process control system 10.

Following the above-described testing of the logic block pattern, it may suitably be replicated in real time process control system 10 (process step 255), and more particularly in the logic block of process controller 105. The testing system may therefore be employed to test the logic block pattern before the pattern is installed in the real time process control system, perhaps even before the process plant to be controlled exists. This would advantageously allow plants to be designed in advance to avoid interactions that would be detrimental to their operation.

According to the illustrated embodiment, the tested "control configuration" of the logic block pattern is suitably restored to memory, such as a data base, for export to real time process control system 10 (e.g., HONEYWELL'S TDC 3000). Exportation may be performed using any conventional procedure that takes the logic block pattern, or control configuration, from the above-described off-line process and imports the same to real time process control system 10. It should be noted that this may be as simple as moving a disk having an ASCII file.

It should again be noted that although the logic point of HONEYWELL'S TDC 3000 comprises a plurality conventional discrete-type and analog-type devices, alternate embodiments of real time process control system 10 may suitably include any suitably arranged programmable processing circuitry, perhaps including programmable logic devices, such as PALs and PLAs, DSPs, FPGAs, ASICs, LSIs, VLSIs or the like, to form the various types of circuitry comprising one or more logic blocks or a logic point as described and claimed herein.

In one embodiment of the present invention, the real time process control system comprises at least a selected one of firmware storage circuitry and application specific integrated circuitry to contain the logic block pattern. As those skilled in the art understand, conventional logic devices, such as PALs and PLAs, DSPs, FPGAs, ASICs, LSIs, VLSIs and the like, are advantageously employed to accomplish simultaneous control of multiple devices by removing dependencies that occur when data is required to be processed serially, such as in a conventional scalar computer processor. Real time process control system 10 may also use PALs and PLAs, DSPs, FPGAs, ASICs, LSIs, VLSIs and other firmware or hardware devices to store the logic block pattern. Because the testing computer of the present invention is not constrained to operate in real time, the logic block pattern may also suitably be stored in computer memory and executed serially; the time base simply shifts to make the serial execution quasi-simultaneous.

Figure 3A:
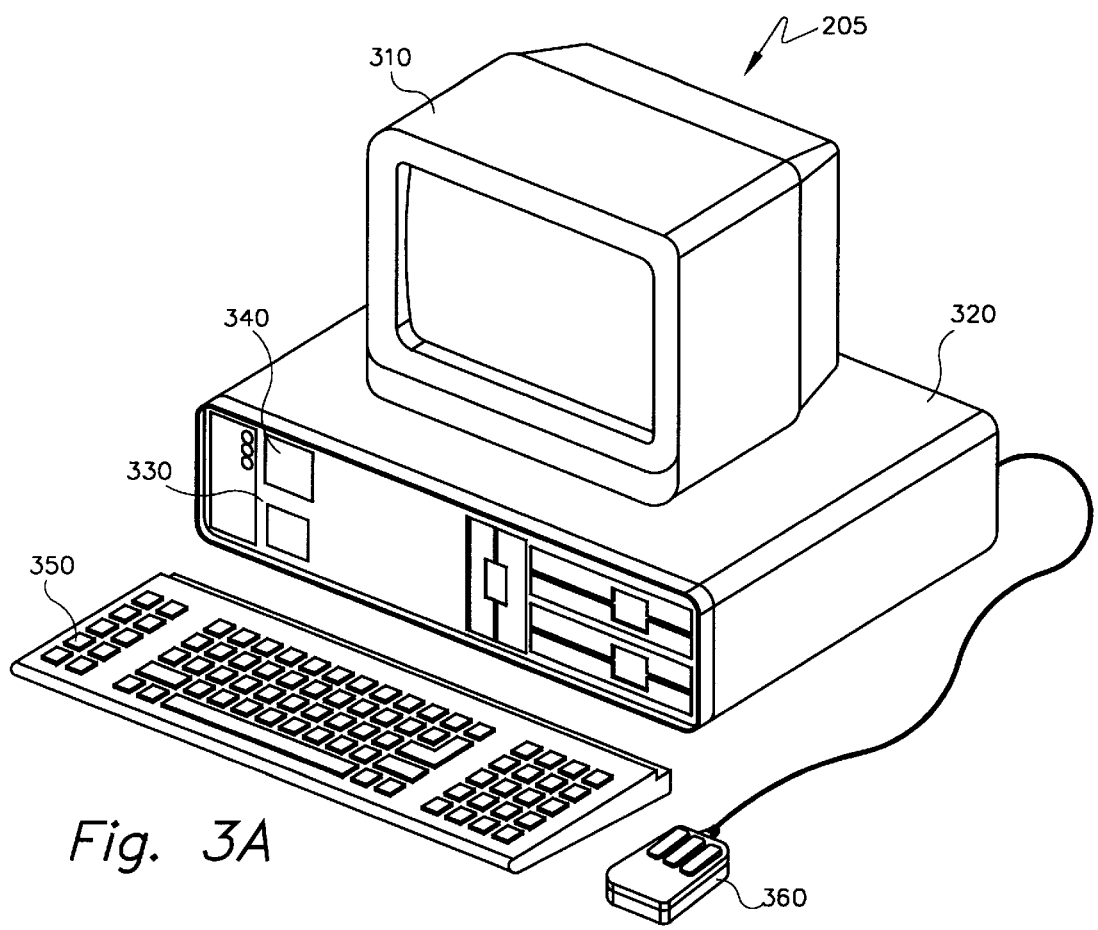
FIG. 3A illustrates an isometric view of a conventional computer that provides an environment within which the present invention may suitably be implemented and operated.

Turning now FIG. 3A, illustrated is an isometric view of a conventional computer 205, a personal computer ("PC"), that provides an environment within which the present invention may suitably be implemented and operated. Since the present invention is not limited to application in a personal computing environment, FIG. 3A is illustrative only.

Exemplary PC 205 includes a display device or monitor 310, a main chassis 320, within which are various electronic components (discussed with reference to FIG. 3B), and a plurality of exemplary conventional user interfaces, including a keyboard 350 and a mouse 360.

Display device 310, keyboard 350 and mouse 360 cooperate to allow communication between PC 205 and a user (not shown). Main chassis 320 illustratively includes a dedicated hardware reset switch 330 (adapted to trigger hardware reset circuitry (not shown) within main chassis 320 to reboot or restart PC 205 when the user depresses reset switch 330) and a power switch 340 (capable of interrupting and restoring power to PC 205). Interruption and restoration of power brings about a restart of PC 205.

Display device 310 provides an area for display of graphical data under the control of a conventional GUI operating system (not shown) executing within PC 205. GUI operating systems manage division of computer resources among various user-selected application tasks executing on PC 205, including division of the area of display device 310 into a plurality of suitably arranged windows that display data corresponding to each of the user-selected application tasks. Each window may suitably be allowed to occupy a portion or an entirety of the area presented on display device 310, depending on the user's wishes. Various ones of the windows may suitably occlude one another, whether in whole or in part.

While computers have been illustrated generally using PC 205, it should be noted that the principles of the present invention may be implemented and used with any suitably arranged computer system for simulating signal flow through a logic block pattern of a real time process control system, including laptop/notebook, mini, main frame and super computers, as well as networks of computers, such as local-area, metropolitan-area and wide-area networks, for example.

Figure 3B:
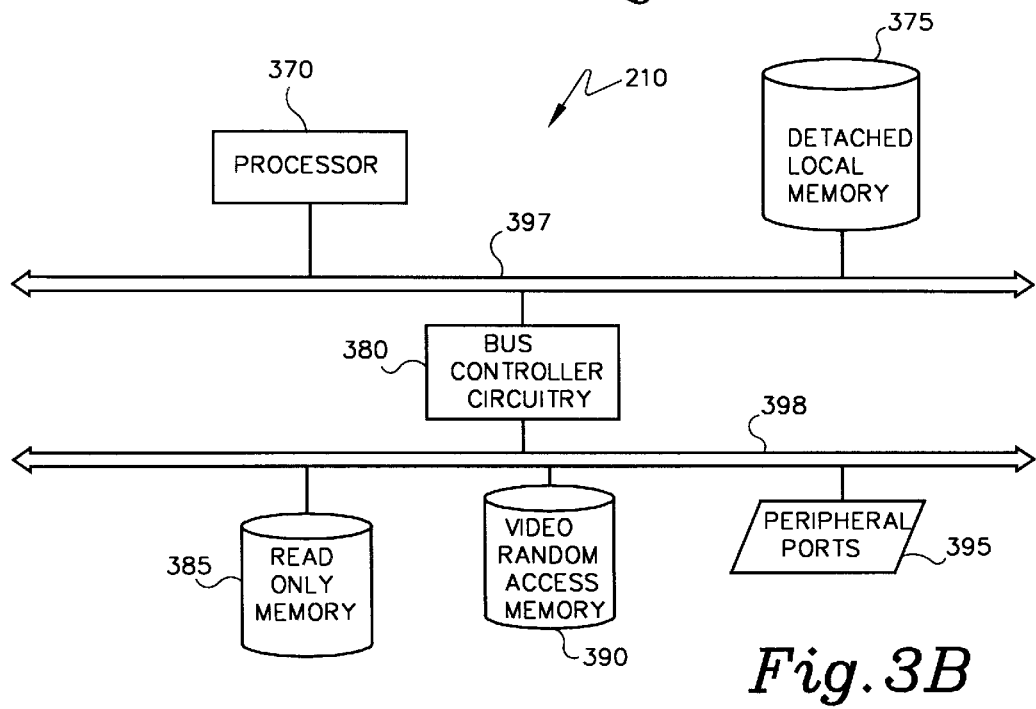
FIG. 3B illustrates a high-level block diagram of exemplary processing circuitry that may suitably be associated with the computer of FIG. 3A to provide an environment within which the present invention may suitably be implemented and operated.

Turning to FIG. 3B, illustrated is a high-level block diagram of exemplary processing circuitry (generally designated 210) that may suitably be associated with a computer, such as PC 205, to provide an environment within which the present invention may suitably be implemented and operated. Processing circuitry 210 illustratively includes a processor 370, a conventional random access memory ("RAM") 375, bus controller circuitry 380, a conventional read-only memory ("ROM") 385, a conventional video random access memory ("VRAM") 390 and a set of peripheral ports 395. An exemplary host bus 397 is shown and is suitably operative to associate processor 370, RAM 375 and bus controller circuitry 380. An exemplary input/output ("I/O") bus 398 is shown and is operative to associate bus controller circuitry 380, ROM 385, VRAM 390 and the set of peripheral ports 395. The set of peripheral ports 395 may suitably couple I/O bus 398 to any one or more of a plurality of conventional suitably arranged peripheral devices for communication therewith. Included among the set of peripheral ports 395 may suitably be one or more serial or parallel ports.

Bus controller circuitry 380 provides suitable means by which host bus 397 and I/O bus 398 may be associated, thereby providing a path and management for communication therebetween. Each of the illustrated buses 397 and 398 requires a drive current to carry signals thereon. The illustrative circuit accordingly operates in conjunction with a conventional system controller (not shown) that supplies the required drive current. Of course, the illustrative circuitry may also suitably be implemented having only a single bus or three or more buses.

According to the illustrated embodiment, exemplary RAM 375 may suitably be adapted, at least in part, for storing tasks for execution by processor 370. Processor 370 is operative upon execution of one or more the stored tasks to access exemplary VRAM 390 to display data on display device 310. As stated hereinabove, one or more of those tasks may suitably embody the principles of the present invention to simulate signal flow through a logic block pattern of real time process control system 10.

The one or more tasks are associated with a data base of input data associated with simulated sensors and a rule base containing control rules and constituting the logic block pattern. Executing processor 370 operates in an arbitrary time base to apply the input data to the control rules to simulate signal flow through the logic block pattern to produce simulated output data and real time control system responses to test the logic block pattern.

In alternate advantageous embodiments, processing circuitry 210, in whole or in part, may be replaced by, or combined with, any suitable processing configuration, including programmable logic devices, such as PALs and PLAs, DSPs, FPGAs, ASICs, LSIs, VLSIs or the like, to form the various types of circuitry described and claimed herein.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference for all purposes.

Figure 4:
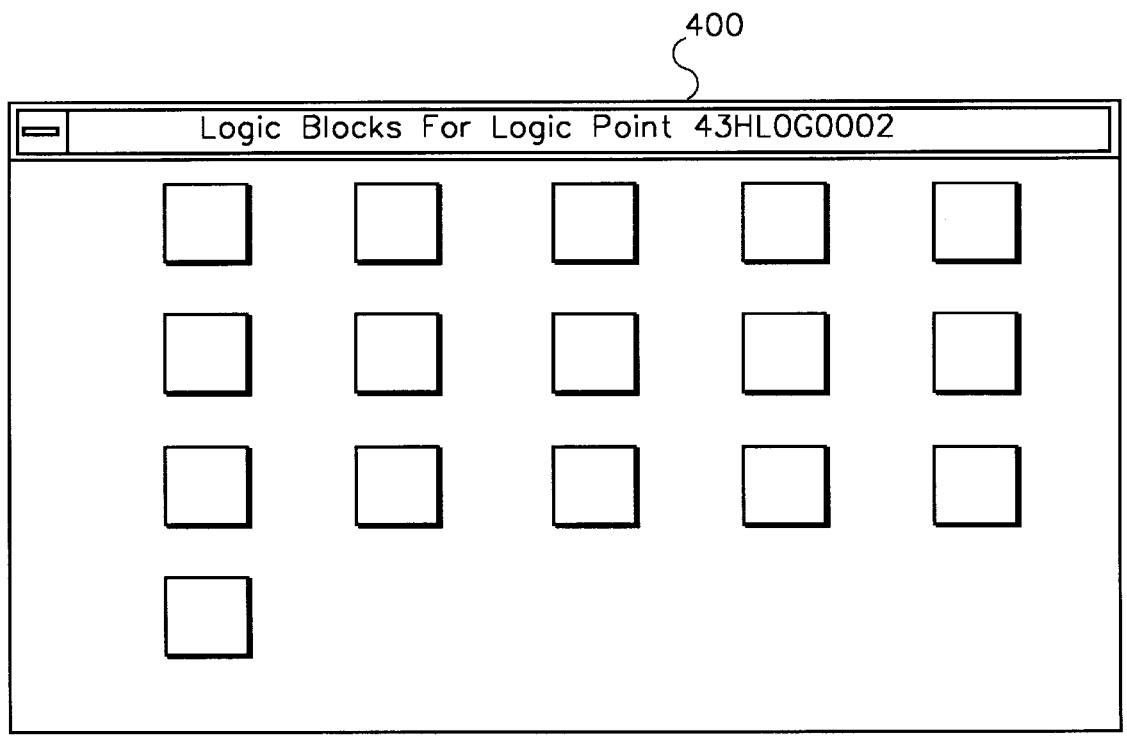
FIG. 4 illustrates a graphical user interface screen of an exemplary logic block menu in accordance with an illustrated embodiment.

Turning now to FIG. 4, illustrated is a GUI screen of an exemplary logic block menu (generally designated 400) in accordance with the illustrated embodiment. Exemplary screen 400 is "windows"-based and may suitably be accessed using a conventional mouse, such as mouse 360 of FIG. 3A, for example. The collection of associated graphical block elements displays the logic block pattern in a form that is intuitively easy to understand (those skilled in the art are familiar with window technology and their use in process or control environments).

According to the illustrated embodiment, screen 400 enables a user (not shown) to select an individual one of the plurality of logic block representations shown using a single click of the mouse. If the user "double" clicks a particular logic block representation, it opens to an associated configuration form.

A selected or activated logic block may be highlighted using a dotted outline, alternatively, the activated logic block may be designated in a contrasting color from inactive ones. Again, by highlighting the logic block elements differently, this embodiment yields a display that assists users interaction. Other contrast indicia, such as shape or text attributes, for example, are certainly within the scope of the present invention.

Turning now to FIG. 5, illustrated is a GUI screen of an exemplary logic block edit form (generally designated 500) in accordance with the illustrated embodiment. Exemplary edit form 500 is enabled by "double" clicking a particular logic block representation, opening this configuration form.

Turning now to FIG. 6, illustrated is a GUI screen of an exemplary logic point/device control point menu (generally designated 600) in accordance with the illustrated embodiment. Exemplary menu 600 includes a plurality of selectable fields. Selection of the (1) "Go to>Next" field causes computer 305 to change user focus or attention and display a screen associated with a logic block page of a next point in sort order; (2) "Go to>Previous" field causes computer 305 to change user focus or attention and display a screen associated with a logic block page of a previous point in sort order; (3) "Go to>First" field causes computer 305 to change user focus or attention and display a screen associated with a logic block page of a first point in sort order; and (4) "Go to>Last" field causes computer 305 to change user focus or attention and display a screen associated with a logic block page of a last point in sort order.

Selection of the "Display Connections" field causes computer 305 to open a box showing a logic point's input and output connections (turning momentarily to FIG. 7, illustrated is a GUI screen of an exemplary logic point connection menu (generally designated 700) in accordance with the illustrated embodiment).

Selection of the "Save Point" field causes computer 305 to save the current point in a project data base to memory.

Selection of the "Save Pattern As" field may cause computer 305 to open a conventional "windows'" file browser to enable data pertinent to the logic point's logic block configuration to suitably be saved in a file in memory for reuse (turning momentarily to FIG. 8, illustrated is a GUI screen of an exemplary logic block pattern link descriptor menu (generally designated 800) in accordance with the illustrated embodiment), this menu is provided to enable generic descriptors and pattern descriptions to be saved. A saved logic block pattern may conceptually be thought of as a template for one or more logic blocks.

According to the illustrated embodiment, one or more of the provided fields may be edited, and, after editing, the "Save Button" may suitably be selected to write the pattern data to the file in memory and return to the logic block page. For logic points, the "logic mix", "logic block configuration", and "point logic connections" are saved, and for device control points, the "gate configuration" and the point's "logic input connections" are saved. Later when a pattern is applied to a point, generic descriptors associated therewith may suitably be entered in the corresponding fields on the point form and may be changed to specific connections.

Selection of the "View Pattern" field similarly causes computer 305 to open a conventional "windows'" file browser to select a logic block pattern file. When a file is selected, its data is read and displayed on the logic block page. This pattern may then be cleared or pasted, as is discussed with respect to the following options.

Selection of the "Clear Pattern" field, which is available if a logic block pattern has been read using "View Pattern", causes computer 305 to clear the pattern, restoring a view of the current logic block configuration.

Selection of the "Paste Pattern" field, which is available if a logic block pattern has been read using "View Pattern", causes computer 305 to paste the pattern into the current point data.

Selection of the "Undo Pattern Paste" field causes computer 305 to delete a logic block pattern, it is available when a logic block pattern has been pasted to the current point, until the point has been saved.

Selection of the "Edit Block" field causes computer 305 to perform the same functions as "double"-clicking on a logic block, as described hereinabove.

Figure 9:
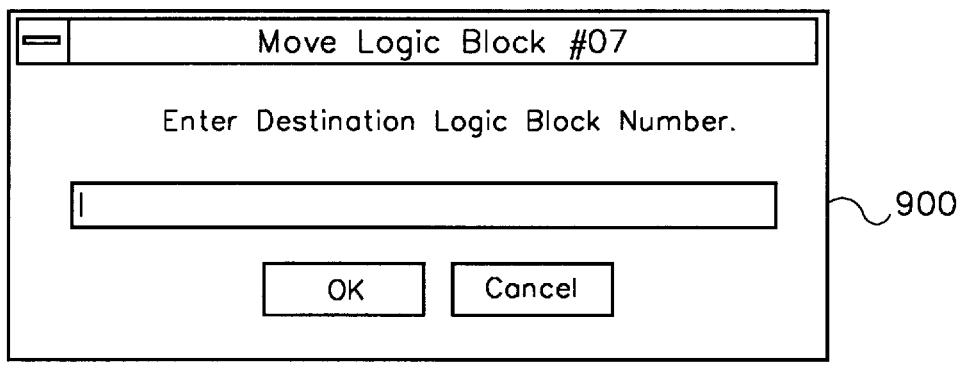
FIG. 9 illustrates a graphical user interface screen of an exemplary move logic block menu in accordance with the illustrated embodiment.

Selection of the "Move Block" field causes computer 305 to move a logic block configuration of the presently selected or activated block to one or more destination blocks (turning momentarily to FIG. 9, illustrated is a GUI screen of an exemplary move logic block menu (generally designated 900) in accordance with the illustrated embodiment). If no destination block is selected, it may suitably be considered null, and a suitable destination logic block menu may be displayed prompting the user for information concerning identification of a destination logic block.

Selection of the "Copy Block" field causes computer 305 to temporarily store, effectively "remember," in memory the logic block configuration of the selected or activated logic block. To apply this memory copy to one or more logic blocks, the user may suitably use a "Paste Block" option, as described next.

Selection of the "Paste Block" field causes computer 305 to apply the memory copy of the logic block configuration to a next selected or activated logic block.

Selection of the "Start Simulation" field causes computer 305 to run the simulation process of the configured logic block pattern of the present invention. During the simulation, active blocks and connections may suitably be highlighted as discussed hereinabove.

Selection of the "Stop Simulation" field causes computer 305 to stop the simulation process of the configured logic block pattern.

Selection of the "Vary Inputs" field causes computer 305 to open a simulator input variation dialog box associated with the configured logic block pattern of the present invention (turning momentarily to FIG. 10, illustrated is a GUI screen of an exemplary simulator input menu (generally designated 1000) in accordance with the illustrated embodiment). The user may suitably use the simulator input variation dialog box to allow setting or modification of inputs, flags, numerics or the like. The simulator input variation dialog box may suitably be left open during a simulation, thereby allowing inputs to be varied so a particular configuration may be studied under various conditions, as described hereinabove.

Figures 11, 12:
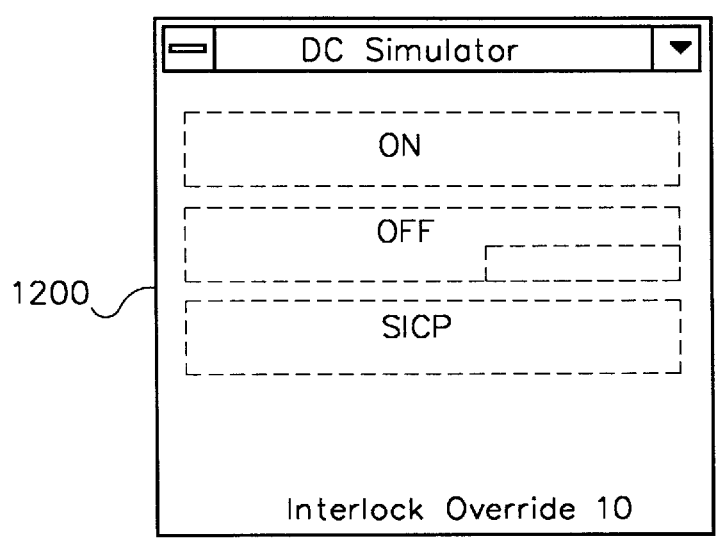
FIG. 11 illustrates a graphical user interface screen of an exemplary simulator outputs dialog box in accordance with the illustrated embodiment.
FIG. 12 illustrates a graphical user interface screen of an exemplary DC simulator box in accordance with the illustrated embodiment.

Selection of the "Watch Outputs" field causes computer 305 to open a simulator outputs dialog box of the present invention (turning momentarily to FIG. 11, illustrated is a GUI screen of an exemplary simulator outputs dialog box (generally designated 1100) in accordance with the illustrated embodiment). The user may suitably use the simulator outputs dialog box to enable the user to view simulation outputs. This box may suitably be left open during simulation so the outputs may be studied.

Selection of the "DC Simulator" (i.e., digital composite) field causes computer 305 to open a DC simulator box of the present invention (turning momentarily to FIG. 12, illustrated is a GUI screen of an exemplary DC simulator box (generally designated 1200) in accordance with the illustrated embodiment). The user may suitably use the DC simulator box to enable the user to view real time process control system 10, such as in the form of HONEYWELL'S TDC 3000, simulated view of the digital composite states. This box may suitably be left open during simulation.

This window may therefore be used to provide the user with a TDC 3000 digital composite interface for testing actual behavior of a device control portion of a device control point configuration. By clicking on the configured state boxes, the simulated feedback may be displayed to the user as either text indicating the improper command or state box color changes indicating the result of a command.

Selection of the "Print" field causes computer 305 to open a print options dialog box for printing logic block diagrams, possibly including tables of the logic connections, values of numerics or the like.

Figure 13:
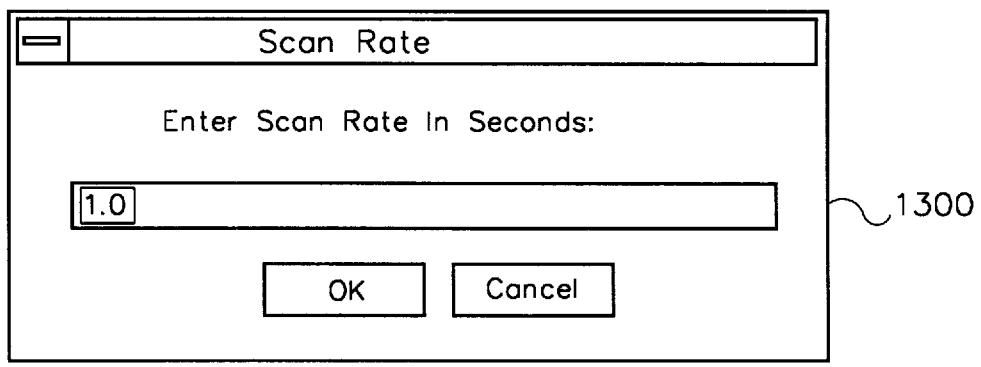
FIG. 13 illustrates a graphical user interface screen of an exemplary scan rate dialog box in accordance with the illustrated embodiment.

Selection of the "Set Scan Rate" field causes computer 305 to open a scan rate dialog box (turning momentarily to FIG. 13, illustrated is a GUI screen of an exemplary scan rate dialog box (generally designated 1300) in accordance with the illustrated embodiment). According to the illustrated embodiment, simulation scan rate may suitably be set from 0.1 to 30 seconds, although alternate embodiments may use other suitable simulation scan rates. The user uses the scan rate dialog box to modify the scan rate. The simulation scan rate is configurable to allow the user to slow the simulation down to follow state specific behavior which in real time may be quite fast.

It should be noted, as discussed hereinabove, that as the simulation proceeds the actual state of the logic blocks is recorded along with the temporal properties of the logic block in the case of pulse or delay type blocks. During each scan the logic blocks may be updated to reflect the actual state and temporal value.

From the above, it is apparent that the present invention provides a testing system for, and method of, simulating signal flow through a logic block pattern of a real time process control system. The system includes: (1) a memory that contains a data base of input data associated with simulated sensors and a rule base containing control rules and constituting a logic block pattern and (2) a processor that operates in an arbitrary time base to apply the input data to the control rules to simulate signal flow through the logic block pattern and thereby produce simulated output data and real time control system responses thereby testing the logic block pattern, the memory and the processor being detached from the real time process control system to prevent use of resources thereof in connection with the logic block pattern testing.

A completely independent testing system is provided that contains a real logic block pattern to be tested, but otherwise simulates the input data, output data and system responses. By providing a testing system that is fully detached from the real time process control system, the present invention frees the real time process control system from testing responsibilities. Again, this decreases testing expense by enabling the logic block pattern to be tested without involving operation of the real time process control system or the plant associated therewith. Plant personnel time is spared in not having to deal with the plant control system. Fully independent operation allows the time base of the testing system to be decoupled from real time ("arbitrary"). In a real time process control system, data are constrained to arrive and depart the system in real time. In the testing system of the present invention, the time base is allowed to expand or contract, as necessary to examine single interactions closely or to move through a volume of data quickly.

Although the present invention and its advantages have been described in detail, those skilled in the art should understand that they can make various changes, substitutions and alterations herein without departing from the spirit and scope of the invention in its broadest form.

What is claimed is:

1. A testing system for simulating signal flow through a logic block pattern of a real time process control system, comprising:

a memory that contains a data base of input data associated with simulated sensors and a rule base containing real time control rules and constituting a logic block pattern, said control rules subject to interactions when applied to real time; and a processor that operates in an arbitrary time base to apply said input data to said real time control rules to simulate signal flow through said logic block pattern and thereby produce simulated output data and real time control system responses thereby testing said logic block pattern, said memory and said processor being detached from said real time process control system to prevent use of resources thereof in connection with said logic block pattern testing.

2. The testing system as recited in claim 1 wherein said logic block pattern is replicated in said real time process control system following said testing of said logic block pattern.

3. The testing system as recited in claim 1 wherein said real time process control system comprises at least a selected one of firmware storage circuitry and application specific integrated circuitry to contain said logic block pattern.

4. The testing system as recited in claim 1 further comprising a data input device that allows said control rules to be modified as a function of a deviation of said simulated output data and real time control system responses from expected values thereof.

5. The testing system as recited in claim 1 wherein said simulated output data are associated with simulated controllable devices of said real time process control system.

6. The testing system as recited in claim 1 further comprising a visual display that displays said logic block pattern as a collection of associated graphical block elements.

7. The testing system as recited in claim 6 wherein active ones of said associated graphical block elements are designated in a contrasting color from inactive ones of said associated graphical block elements during said testing of said logic block pattern.

8. A method of simulating signal flow through a logic block pattern of a real time process control system, comprising the steps of:

storing a data base of input data associated with simulated sensors and a rule base containing real time control rules and constituting a logic block pattern in a memory, said control rules subject to interactions when applied to real time; and operating a processor in an arbitrary time base to apply said input data to said real time control rules to simulate signal flow through said logic block pattern and thereby produce simulated output data and real time control system responses thereby testing said logic block pattern, said steps of storing and operating being performed on a testing computer detached from said real time process control system to prevent use of resources thereof in connection with said logic block pattern testing.

9. The method as recited in claim 8 further comprising the step of replicating said logic block pattern in said real time process control system following said step of operating.

10. The method as recited in claim 8 further comprising the step of storing said logic block pattern in at least a selected one of firmware storage circuitry and application specific integrated circuitry associated with said real time process control system.

11. The method as recited in claim 8 further comprising the step of allowing said control rules to be modified as a function of a deviation of said simulated output data and real time control system responses from expected values thereof.

12. The method as recited in claim 8 wherein said simulated output data are associated with simulated controllable devices of said real time process control system.

13. The method as recited in claim 8 further comprising the step of displaying said logic block pattern as a collection of associated graphical block elements on a visual display.

14. The method as recited in claim 13 further comprising the step of designating active ones of said associated graphical block elements in a contrasting color from inactive ones of said associated graphical block elements during said step of operating.

15. A testing system for simulating signal flow through a logic block pattern of a real time process control system, comprising:

- a memory that contains a data base of input data associated with simulated sensors and a rule base containing real time control rules and constituting a logic block pattern, said control rules subject to interactions when applied to real time;
- a processor that operates in an arbitrary time base to apply said input data to said real time control rules to simulate signal flow through said logic block pattern and thereby produce simulated output data and real time control system responses thereby testing said logic block pattern, said memory and said processor being detached from said real time process control system to prevent use of resources thereof in connection with said logic block pattern testing;
- a visual display that displays said logic block pattern as a collection of associated graphical block elements; and
- data input device that allows said control rules to be modified as a function of a deviation of said simulated output data and real time control system responses from expected values thereof.

16. The testing system as recited in claim 15 wherein said logic block pattern is replicated in said real time process control system following said testing of said logic block pattern.

17. The testing system as recited in claim 15 wherein said real time process control system comprises at least a selected one of firmware storage circuitry and application specific integrated circuitry to contain said logic block pattern.

18. The testing system as recited in claim 15 wherein said simulated output data are associated with simulated controllable devices of said real time process control system.

19. The testing system as recited in claim 15 wherein active ones of said associated graphical block elements are designated in a contrasting color from inactive ones of said associated graphical block elements during said testing of said logic block pattern.

20. The testing system as recited in claim 15 wherein said arbitrary time base is nonlinear.

* * * * *